(12) United States Patent
Armagost et al.

(10) Patent No.: US 12,703,277 B1
(45) Date of Patent: Aug. 11, 2026

(54) SEATBACK LOAD PLATE

(71) Applicant: Zoox, Inc., Foster City, CA (US)

(72) Inventors: Daniel Scott Armagost, San Mateo, CA (US); Markus Jost, San Mateo, CA (US); Samantha Lynne Schoell, San Francisco, CA (US); Andrew Frank Raczkowski, San Jose, CA (US); Nirmal Muralidharan, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 421 days.

(21) Appl. No.: 17/829,060

(22) Filed: May 31, 2022

(51) Int. Cl.
*B60N 2/42* (2006.01)

(52) U.S. Cl.
CPC .................................. *B60N 2/4228* (2013.01)

(58) Field of Classification Search
CPC .................................................... B60N 2/4228
USPC .................................................... 297/216.13
See application file for complete search history.

(56) References Cited

U.S. PATENT DOCUMENTS 5,769,489 A * 6/1998 Dellanno ............. B60N 2/4228 297/216.12
5,836,547 A * 11/1998 Koch .................. B60N 2/4249 297/216.12
8,714,641 B2 * 5/2014 Cyoukyu ................. 297/216.13
9,211,827 B2 * 12/2015 Michalak ................ B60N 2/56
2021/0370811 A1 * 12/2021 Jaradi

FOREIGN PATENT DOCUMENTS

DE 4238549 A1 * 5/1994

* cited by examiner

*Primary Examiner* — Anthony D Barfield
(74) *Attorney, Agent, or Firm* — Lee & Hayes, P.C.

(57) ABSTRACT

A seat of a vehicle is designed for safety to reduce risk of injury to an occupant of the seat in the event of an abrupt movement or a collision involving the vehicle from the rear. The seat may have seatback geometry designed to promote coupling an occupant to the seat, thereby minimizing a gap between an occupant and the seatback and, therefore, the impact forces to the occupant in a rear-facing collision by reducing a relative velocity between the occupant and the seat, as well as absorbing energy of the occupant over a longer distance. The seat may include one or more load plates and materials that plastically deform under a force imparted on the seat by the occupant accelerating relative to and toward the seat during a vehicle collision. The load plates distribute the force across the energy absorbing material to reduce the maximum force experienced by the occupant.

17 Claims, 6 Drawing Sheets

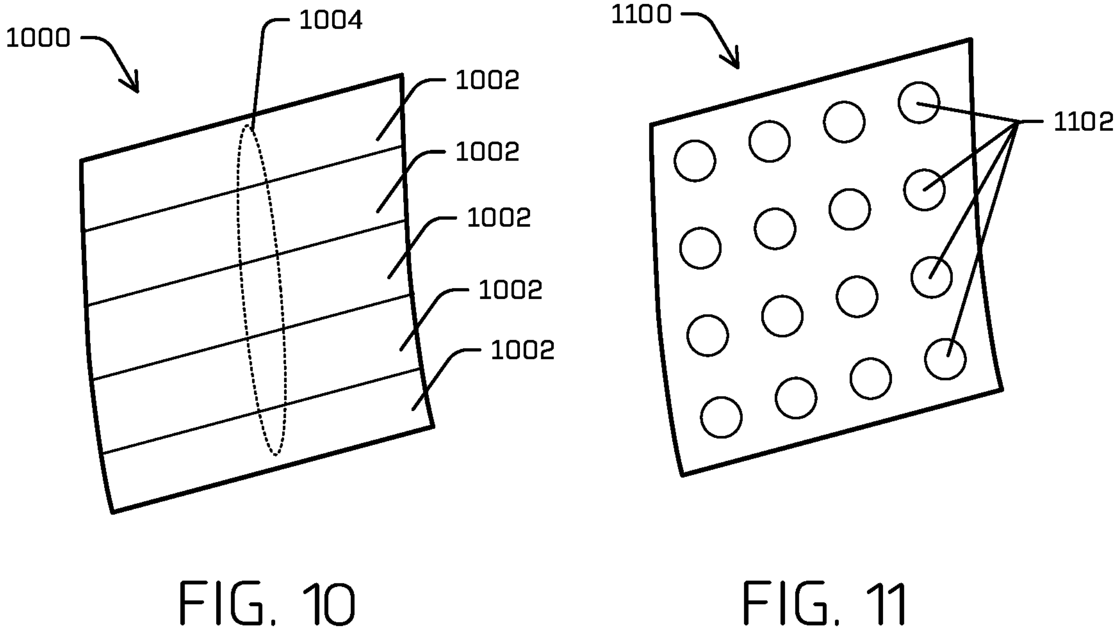
FIG. 10
FIG. 11
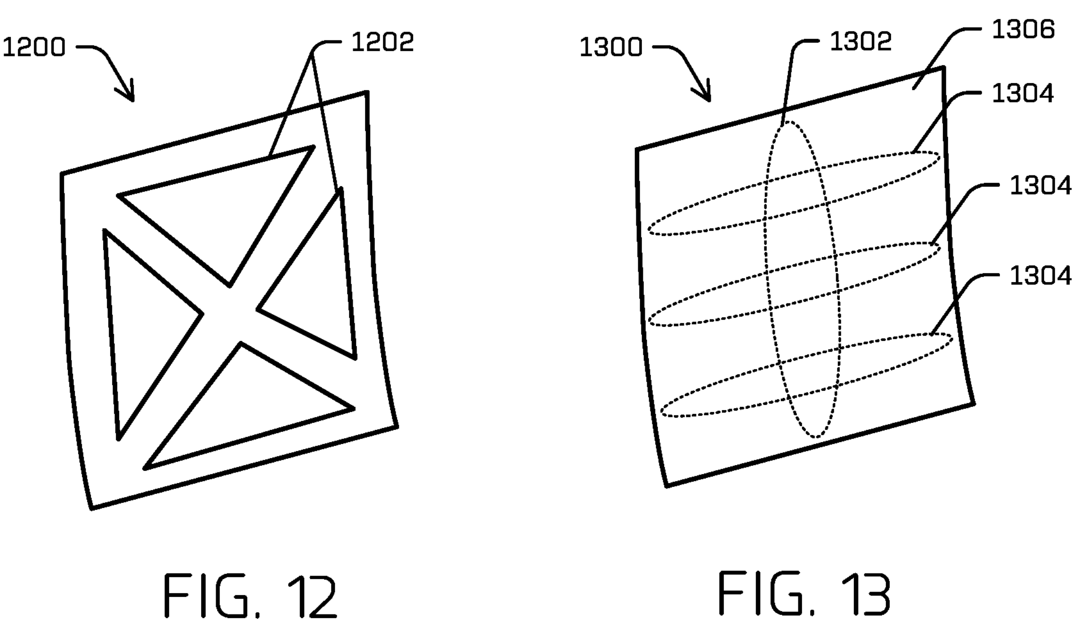
FIG. 12
FIG. 13

SEATBACK LOAD PLATE

BACKGROUND

A seat for an occupant of a vehicle is generally designed for safety, to reduce risk of injury to the occupant in the event of an abrupt movement or a collision involving the vehicle. For example, the vehicle may experience a collision from the rear or a frontal (e.g., head-on) collision. During a frontal collision, seatbelts may be the primary safety feature. During a collision from the rear, however, safety may rely more on the seat's ability to support the occupant while absorbing energy of inertial forces imparted on the occupant during the collision. Structural requirements of such a seat typically vary for different occupants because of size, presenting serious design challenges for one-size-fits-all approaches.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 10 is a perspective view of an example load plate.

FIG. 11 is a perspective view of an example load plate.

FIG. 12 is a perspective view of an example load plate.

FIG. 13 is a perspective view of an example load plate.

DETAILED DESCRIPTION

Figure 1:
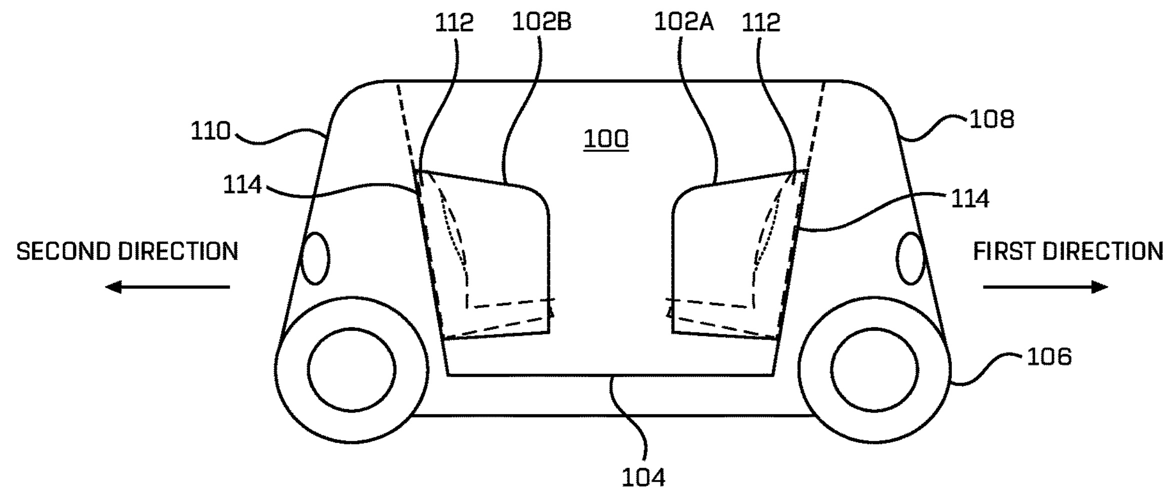
FIG. 1 is a schematic side view of an example vehicle having seats.

This disclosure relates to designs and construction of a seat for a vehicle. The seat is designed for safety, among other things, to reduce risk of injury to an occupant of the seat in the event of an abrupt movement or a collision involving the vehicle from the rear. During such a collision, for example, safety generally relies on the seat's ability to support the occupant while absorbing energy of inertial forces imparted on the occupant during the collision. A number of aspects of design and materials of a seat determine its safeness. For example, a seat may have a seatback geometry designed to minimize a gap between an occupant and the seatback, thereby allowing the seat to minimize impact forces to the occupant in a rear-facing collision by absorbing energy of the occupant over a longer distance. For example, particular portions of a seat surface may be recessed (e.g., concave) so that the occupant's body generally follows contours of the seat surface, as described below. In some examples, a seat may include one or more materials that plastically deform under a compressive force, such as a force imparted on the seat by an occupant accelerating toward (relatively speaking) the seat due to a vehicle collision.

In examples described herein, a seat may generally include a seatback, one or two side assemblies, and a seat bottom assembly. However, in other examples, seats may be constructed of a greater or lesser number of assemblies. For instance, in some examples, seats may be constructed of a single assembly or tub that includes a seat bottom, a seatback, a first side, and/or a second side. The seat may be configured to hold one or more occupants sitting side by side.

As discussed above, traditional safety features may not adequately protect rear-facing occupants in a vehicle with a carriage seating configuration. This application relates to an energy absorber and load distribution plate, referred to herein as a load plate, for distributing the load of an occupant over an energy absorber. In a vehicle configuration, an energy absorber may occupy a larger volume or space than is available within the constraints of the seat and/or vehicle cabin. In such examples, in order to ensure the energy absorber is capable of withstanding and absorbing sufficient energy during a collision, the load plate may distribute the force as a result of the occupant accelerating during a collision over a greater surface area of the energy absorber to provide energy absorption for the occupant independent of the surface area of the occupant, e.g., regardless of the frame size of the occupant that may be in contact with the seatback. For example, an energy absorber may be limited to a thickness of less than 100 millimeters in some vehicle configurations, and the load plate enables an energy absorber, such as a crushable element, to absorb energy during the collision to provide for occupant safety as a result of the load distributed over the entire and/or a larger portion of the energy absorber through the load plate.

The load plate can include a curved or non-flat surface formed of a rigid material. A front surface of the seat may include a cushioning material for comfort. However, the use of a cushioning material limits an initial ramp rate of energy absorption by the crushable energy absorber. The use of the load plate to spread the force over the energy absorber increases the ramp rate of energy absorption. The energy absorber may include a crush structure disposed in a seat back to absorb energy of the occupant during a collision. The load plate may promote earlier restraint of the occupant during a collision to improve occupant safety. The crush structure may comprise one or more crushable elements(s) protruding from a sheet or backplane disposed within, on, or behind the seat of a vehicle. During a collision, the load plate distributes the force as a result of the occupant moving over the energy absorber. The energy absorber may include a crush structure that is configured to plastically deform to absorb energy of the impact and reduce the forces applied to the passenger's body during the rapid deceleration or ramp down. In some examples, one or more of the crush structures, or one or more individual crushable elements thereof, may have a surface area, height, thickness, and depth configured to cause the crush structure or crushable element(s) to plastically deform in an axial direction substantially parallel to a longitudinal axis of the vehicle and to limit deflection in lateral and vertical directions of the vehicle. The longitudinal axis of the vehicle is an axis extending along a length of the vehicle, such that the longitudinal axis is generally aligned with a direction of travel of the vehicle when the vehicle is traveling in a straight line. The longitudinal axis can be longer than a lateral, perpendicular axis.

In some examples, the techniques described herein may be implemented in a vehicle having a body, which may include a passenger compartment. The passenger compartment may include at least one seat configured to receive an occupant. In some examples, the seat may include a seatback having a first side to receive an occupant and a second side opposite the first side. In some examples, the seatback may include an energy absorber and load plate disposed between the first side of the seatback and the second side of the seatback. The load plate can be positioned between the first side and the energy absorber. The load plate can be formed of a rigid material to receive force from the occupant as a result of the collision and distribute it over the energy absorber. The energy absorber, in some examples, may provide protection to an occupant in the event of a collision or impact. For instance, in some examples, the energy absorber may include a backplane and/or a crush structure. In some examples, the backplane may be a generally rectangular sheet of material, however, other configurations may be used.

In some examples, the load plate may be formed of a rigid material such as carbon fiber, aluminum, steel, plastic (e.g., PVC or ABS plastic), or other such rigid materials including combinations of one or more materials. The load plate may be configured to withstand and/or exceed the anticipated loads on the energy absorber. For example, the load plate may be configured to withstand forces in excess of 8.95 kilonewtons. The load plate may have a thickness of between one and three millimeters, or may, in some examples (such as in a case of a steel load plate) have a thickness of less than one millimeter. The load plate may have a rectangular shape and may be positioned behind the occupant space where an occupant may sit within the vehicle. The load plate may have a curvature in a first and/or second direction. For example, the curvature may follow or mimic a shape of a spine of an occupant. In some examples, the load plate may curve along the shape of a spine as well as in a second direction perpendicular to the first curvature. In some examples, the load plate may cover some or all of the seatback structure. The load plate may be one of multiple load plates, positioned behind one or more occupant spaces. The load plate may extend across a full width of the seatback in some examples. In some examples, the load plate may have a shape other than rectangular, such as an oval, circular, irregular, or other shape.

The load plate may, in some examples, have a varying thickness and/or other configuration besides a solid plate. For example, the load plate may have a first thickness at a center of the load plate, e.g., a medial location where a spine of the occupant may be positioned when in the seat and have a second thickness at a distal edge of the load plate. In some examples, the thickness may vary based on one or more design optimization algorithms. The load plate may also include one or more openings or passages that may be used to reduce the weight of the load plate while maintaining the energy distribution characteristics.

The load plate is configured to accommodate occupants of varying sizes, for example to accommodate the upper back region of occupants in a $95^{th}$ percentile range, $50^{th}$ percentile range, and a $5^{th}$ percentile range. In some examples, the load plate may cover a majority or near entirety of the seatback to accommodate such varying sizes. The seatback may have a width of over 900 millimeters, a height in a range of 250 millimeters to 350 millimeters, and a thickness in a range of 100 millimeters to 175 millimeters. A first layer of the seatback, such as a seatback surface layer that receives an occupant, may have a thickness of ten to twenty millimeter. An energy absorbing material may have a thickness in a range of seventy-five to one hundred and twenty-five millimeters. The thickness constraints limit the ability to increase the thickness of an energy absorber within the confines of the seatback and the limitations of a vehicle cabin, therefore the load plate enables the seatback to include energy absorbing capacity that exceeds safety recommendations while remaining within the thickness constraints of the seatbacks for vehicle seats. necessitate the use of energy absorbers.

In some examples, the load plate may have a generally rectangular shape with a length in a range of 250 millimeters to 350 millimeters and a width in a range of 200 millimeters to 300 millimeters. In some examples, the load plate may have a width of over 400 millimeters and span across multiple occupant seating areas. In some examples, the curvature may be defined based on a passenger or occupant profile that is based on expected curvature for occupants of varying percentile ranges. In some examples, the curvature of the load plate may be configured to accommodate the varying sizes by being based on a curvature of an anticipated spine shape for occupants in a middle range (e.g., about $50^{th}$ percentile) or may be curved such that the load plate is only slightly curved, and is thereby able to accommodate the occupants of varying sizes. The load plate may also enable the energy absorber of the seatback to adequately serve occupants of varying sizes by distributing the load across a greater area of the energy absorber. For example, a smaller occupant may only contact a small portion of the seatback and therefore only a small portion of the energy absorber. The load plate enables the energy of the collision to be distributed to the energy absorber where the occupant may not necessarily contact the energy absorber otherwise, thereby more effectively distributing the energy.

The crush structure may include one or more crushable elements protruding from all or part of the backplane. The crush structure may be configured to minimize the force applied to an occupant in the event of an impact or collision. For instance, the crush structure or individual crushable element(s) thereof may be configured to deform along a deformation axis under a compressive force. In some examples, the deformation axis may be substantially parallel to a direction in which the crushable element(s) protrude from the backplane and/or may be aligned with the longitudinal axis of the vehicle. The crush structure may be designed (e.g., shaped and sized) to limit or prevent deflection of the crushable element(s) in a vertical or lateral direction. By designing the crush structure to deform along the deformation axis and not to deflect vertically or laterally, the crush structure may provide a substantially uniform reaction force over an entire ramp down distance, thereby maximizing an amount of energy that the energy absorber is able to absorb during the collision and minimizing forces applied to the passenger. One or more energy absorbers may be used in coordination with the load plate, including a crush structure as described with respect to U.S. patent application Ser. No. 16/917,079, filed Jun. 30, 2020 titled "Seat Back Energy Absorber," the entirety of which is incorporated by reference herein for all purposes. In some examples, other energy absorbers and/or crush structures may be used in connection with the load plate described herein.

In some examples, the energy absorber may include a pelvic and/or lumbar support structure. The pelvic and/or lumbar support structure may, in some examples, be disposed below the backplane and/or the crushable element(s). In some examples, the pelvic and/or lumbar support structure may include a separate load plate and crushable element and be comprised of the same material(s) as the load plate and/or the crushable element(s). In other examples, the pelvic and/or lumbar support structure may include one or more different materials than the backplane and/or the crushable element(s).

In some examples, the energy absorber may be designed to plastically deform under a predetermined compressive load. The predetermined compressive load may be determined based on size and weight of anticipated passengers of the vehicle and anticipated collision speeds. The size, shape, and materials of the backplane, crush structure, and/or pelvic support structure may be chosen so that the energy absorber begins to deform when the predetermined compressive load is reached.

As used herein, a characteristic of energy absorbers is that an applied force does not substantially increase as the material continues to deflect (e.g., deform) over at least a portion of a range of applied forces. Subsequent to the instant of a collision, an occupant of a seat will accelerate relative to and toward a seatback of the seat, leading to a rearward force proportional to the acceleration. The rearward force causes the occupant to push against the seatback with a force that inelastically compresses energy absorbing material. If such compression were not inelastic moments after the collision the different material would recoil (e.g., expand) forward and possibly place injurious forces on the occupant. Thus, the deflection (or deformation) of the energy absorbing material allows for dissipation of forces evenly, applying a non-injurious force to the occupant without such recoil. The load plates described herein further aid in the dissipation of energy by increasing the energy absorption through deflection and deformation of the load plate against the energy absorbers and also delays restraint for rear-facing occupants of the vehicle, which may reduce a shock or impact as felt by the occupant.

In some examples, the load plate, the crush structure, and/or the pelvic support structure may be formed from a plastically deformable material having a compression strength between about 2 megapascals and about 6 megapascals at normal operating temperatures of between −15 degrees Celsius and 60 degrees Celsius. In some examples, the material from which the backplane, the crush structure, and/or the pelvic support structure are made may have a density of at most about 100 grams per liter, at most about 75 grams per liter, or at most about 40 grams per liter. By way of example and not limitation, the crush structure and/or the pelvic support structure may be made of a polymeric foam (e.g., Impaxx 300, expanded polypropylene (EPP) foam density 30 grams per liter or 45 grams per liter, urethane foam, polystyrene foam, etc.), plastic, aluminum, cellulose based material, or a combination of these and/or other materials, for example. In one specific example, the backplane, the crush structure, and/or the pelvic support structure may be formed of a closed cell, thermoplastic foam having a density of at most 40 grams per liter, and a compression strength of at least about 3 megapascals at 60 degrees Celsius and at most about 5 kilopascals at −15 degrees Celsius.

Depending on the materials from which the load plate and energy absorbers are made, the load plate, the crush structure, and/or the pelvic support structure may be formed by extrusion, molding (e.g. injection molding), casting, machining (e.g., by removing select portions of material from one or more blocks of material to form the crushable element(s)), or by other suitable manufacturing techniques. The load plate may be integrally formed with the energy absorber. In some examples, the load plate may be adhered to the energy absorber, though each may be formed individually. The load plate, the crush structure, and/or the pelvic support structure may be formed separately and attached to one another by, for example, fasteners, adhesive, thermal or sonic welding, interlocking shapes, or other attachment means. In other examples, the load plate, the crush structure, and/or the pelvic support structure may be constructed integrally from a same material. In still other examples, some components or elements of the energy absorber may be formed integrally of a same material and other components or elements of the energy absorber may be formed separately and/or of a different material. By way of example and not limitation, the load plate and crush structure may be formed integrally of a first material and the pelvic support structure may be formed of a separate material and then attached to a separate load plate.

While examples are provided in which the vehicle is a bidirectional vehicle having carriage seating, with a first set facing in a first direction and a second seat facing in an opposite direction, the techniques described herein are not limited to bidirectional vehicles or to vehicles having carriage seating. For example, the techniques may be applied to traditional, unidirectional vehicles (e.g., cars, trucks, busses, trains, etc.) with front facing occupants and would provide protection for occupants in the case of the vehicle being rear ended, for example.

Figure 2:
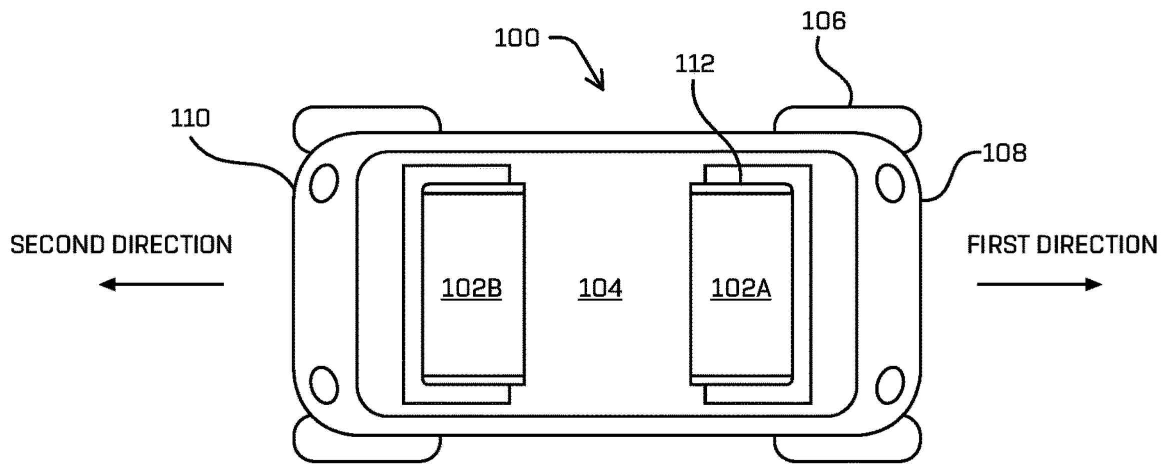
FIG. 2 is a schematic top view of the example vehicle having the seats.

FIG. 1 is a schematic side view of an example vehicle 100 having seats 102. FIG. 2 is a schematic top view of vehicle 100. While this example includes two seats 102 oriented facing one another (e.g., a "carriage seating" configuration), in other examples any number of one or more seats may be disposed in a vehicle at locations and/or orientations other than what is indicated in FIGS. 1 and 2. For instance, though illustrated as bench style seats which can accommodate multiple passengers herein, in some examples, multiple individual and/or bench style seats may be disposed in rows facing a same direction or differing directions, or a single seat may be disposed in a vehicle. In the illustrated example, seats 102 may include a first seat 102A in one part of the vehicle and a second seat 102B in another part of the vehicle. An occupant(s) in first seat 102A may be positioned by the first seat to face an occupant(s) in second seat 102B, and these occupants may share a common floor area 104.

In some examples, vehicle 100 may be an autonomous vehicle configured to operate according to a Level 5 classification issued in 2016 by the U.S. National Highway Traffic Safety Administration, for example, which describes a vehicle capable of performing all safety-critical functions for an entire trip, with the driver (or occupant) not being expected to control the vehicle at any time. In that case, since the vehicle may be configured to control all functions from start to stop, it may be unoccupied. This is merely an example, however, and the systems and methods described herein may be incorporated into any ground-borne vehicle, including those that are manually driven by a human and those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

Vehicle 100 is depicted as having four wheels/tires 106. However, other types and configurations of vehicles are contemplated, such as, for example, vans, sport utility vehicles, crossover vehicles, trucks, buses, agricultural vehicles, and construction vehicles. Vehicle 100 may be powered by one or more internal combustion engines, electric motors powered by one or more power supplies (e.g., batteries, hydrogen fuel cells, etc.), or any combination thereof. In addition, although vehicle 100 is illustrated to have four wheels/tires 106, the systems and methods described herein may be incorporated into vehicles having fewer or a greater number of wheels, tires, and/or tracks. Vehicle 100 has four-wheel steering and may operate generally with equal performance characteristics in all directions, for example, such that a first end 108 of vehicle 100 is the leading or front end of the vehicle when traveling in a first direction, and such that the first end 108 becomes the trailing or rear end of the vehicle when traveling in the opposite, second direction, as illustrated in FIGS. 1 and 2. Similarly, a second end 110 of the vehicle is the leading or front end of the vehicle when traveling in the second direction, and the second end 110 becomes the trailing or rear end of the vehicle when traveling in the opposite, first direction. These example characteristics may facilitate greater maneuverability, for example, in small spaces or crowded environments, such as parking lots and urban areas.

In some examples, because of a bi-directionality of vehicle 100, each of first seat 102A and second seat 102B may, at different times, be a leading or a trailing seat, as determined by direction of travel of the vehicle. Also, each of first seat 102A and second seat 102B may, at different times, be a forward-facing seat or a rear-facing seat, as determined by direction of travel of the vehicle. For example, while first end 108 of vehicle 100 is the leading or front end of the vehicle (e.g., when traveling in the first direction), the occupant(s) in first seat 102A is facing backward (e.g., away from the direction of travel) and the occupant(s) in second seat 102B is facing forward (e.g., toward the direction of travel). In such a case, a collision against first end 108 of vehicle 100 by an object may impart a rear-end type collision on the occupant(s) in first seat 102A (e.g., occupant(s) accelerating toward, relative to, a seatback 112 of first seat 102A) while imparting a front-end type collision on the occupant(s) in second seat 102B (e.g., occupant(s) accelerating away (relative to the seatback) from seatback 112 of second seat 102B). On the other hand, while second end 110 of vehicle 100 is the leading or front end of the vehicle (e.g., when traveling in the second direction), the occupant(s) in second seat 102B is facing backward (e.g., away from the direction of travel) and the occupant(s) in first seat 102A is facing forward (e.g., toward the direction of travel). In such a case, a collision against second end 110 of vehicle 100 by an object may impart a rear-end type collision on the occupant(s) in second seat 102B while imparting a front-end type collision on the occupant(s) in first seat 102A.

As described below, seats 102 may be attached to a body portion 114 of vehicle 100 (either directly or indirectly, e.g., via an intermediate member or members). Body portion 114 may extend from the common floor area 104 to above or below a height of seatback 112. In some examples, backs of the seats 102 may be directly adjacent and in contact with the body portion 114 of the vehicle 100. That is, there may be no gap, frame, or support structure disposed between the backs of the seats 102 and the body portion 114 of the vehicle 100. This can distribute forces between the seats 102 and the body portion 114 over a relatively large area (the contact area of the seat with the body portion of the vehicle), thereby minimize flexure of the seats 102 during collision and avoiding point loads caused by intervening frames or support structures.

Figure 3:
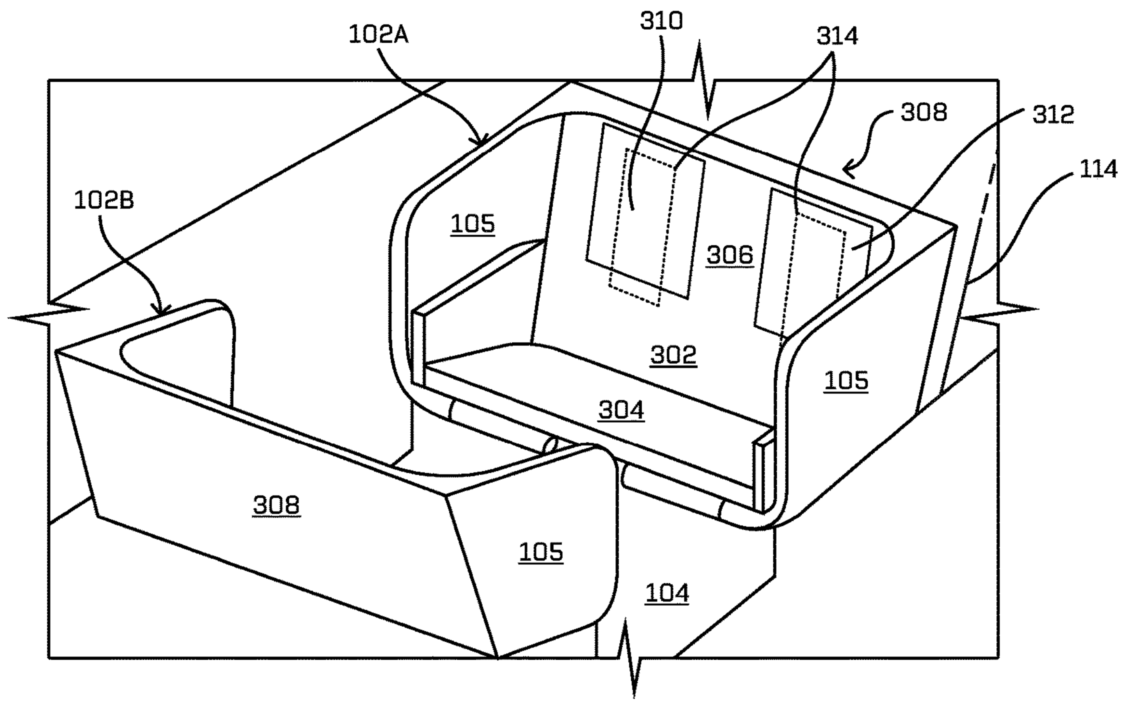
FIG. 3 is a perspective view of example seats of a vehicle.
Figure 4:
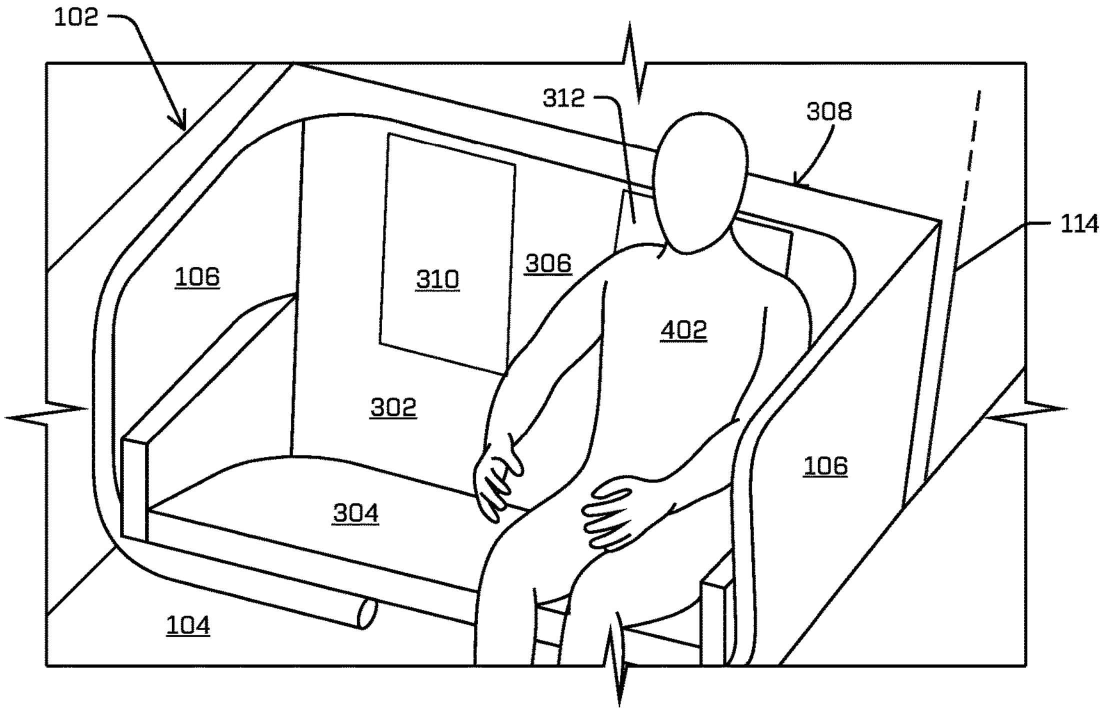
FIG. 4 is a perspective view of an example seat including an occupant.

FIG. 3 is a perspective view of a portion of vehicle 100, having seats 102 that includes seat 102A and seat 102B. FIG. 4 is a perspective view of one of seats 102 including an occupant 402. A common floor area 104 may be shared between the two seats. This perspective view illustrates an angled front view of seat 102A and an angled rear view of seat 102B. Each seat 102 comprises a seatback 302, hereinafter referred to simply as a seatback, a lower assembly 304 (or seat bottom assembly), and one or more side assemblies 105. In particular, seatback 302 has a first side 306 to receive an occupant (e.g., 402 in FIG. 4) and a second side 308 opposite the first side. Of course, though illustrated as multiple assemblies having multiple seating positions, such seats may be individual, integrally formed, or formed by coupling two or more subassemblies.

As discussed above, a number of aspects of design and materials of a seat determine its safeness. For example, the seat may be shaped so that the occupant's body generally falls or conforms into contours of the seat surface. The use of cushioning materials may delay energy absorption by the energy absorber and limit a ramp rate of energy absorption. The load plate 310 and load plate 312 may be positioned behind or underneath a polyurethane layer covering the seats 102. The load plate 310 is behind a first occupant space while the load plate 312 is behind a second occupant space. The load plate 310 has a width corresponding to an expected width of the occupant, for example based on a $50^{th}$ percentile rank of occupant widths.

The load plate 310 or load plate 312 includes a curved or non-flat surface formed of a rigid material. A front surface of the seats 102 may include a cushioning material for comfort. However, the use of a cushioning material limits an initial ramp rate of energy absorption by the crushable energy absorber. The use of the load plates 310 and 312 to spread the force over the energy absorber increases the ramp rate of energy absorption. The energy absorber may include a crush structure disposed in a seat back to absorb energy of the occupant during a collision. The load plates 310 and 312 may promote earlier restraint of the occupant during a collision to improve occupant safety. The crush structure may comprise one or more crushable elements(s) protruding from a sheet or backplane disposed within, on, or behind the seat of a vehicle. During a collision, the load plates 310 and 312 distribute the force as a result of the occupant moving over the energy absorber. The energy absorber may include a crush structure that is configured to plastically deform to absorb energy of the impact and reduce the forces applied to the passenger's body during the rapid deceleration or ramp down. In some examples, one or more of the crush structures, or one or more individual crushable elements thereof, may have a surface area, height, thickness, and depth configured to cause the crush structure or crushable element(s) to plastically deform in an axial direction substantially parallel to a longitudinal axis of the vehicle and to limit deflection in lateral and vertical directions of the vehicle. The longitudinal axis of the vehicle is an axis extending through a center of gravity of the vehicle along a length of the vehicle, such that the longitudinal axis is generally aligned with a direction of travel of the vehicle when the vehicle is traveling in a straight line.

As described herein, when the occupant is seated on lower assembly 304, a curvature of the load plate 310 and/or 312 may promote the occupant's body to rest in a position that conforms to a shape of the seatback. Because of this, substantially all of the occupant's back is in contact and/or in relatively close proximity to seatback 302 (minimizing gaps between the occupant's back and the seatback during normal operation). Such contact and/or close proximity allows for a relatively low velocity of the occupant's back relative to seatback 302 during a (rearward) collision. Safeness of seat 102 is improved over that of other vehicle seats because of such a relatively low velocity (e.g., promoting a quicker coupling to the vehicle body in an impact). Also, because the occupant's back is in contact with seatback 302 for a longer period of time during a collision event, seatback 302 with load plates 310 and 312 is able to distribute and absorb energy of the occupant (e.g., decelerate the occupant) over a longer distance, thereby reducing the impact forces experienced by the occupant. Each seat 102 may be configured to hold two occupants at the same time. Thus, seat 102 may include two load plates with corresponding energy absorbers within the seatback 302.

As described herein, in some examples, seatback 302 comprises an energy absorbing material that plastically deforms under a compressive force, which may arise from an acceleration of an occupant's back relative to and against the seatback during a collision. The energy absorbing material may be disposed between the first side 306 and the second side 308 of the seatback 302, and more particularly between the load plates 310 and/or 312 and the second side 308. The energy absorbing material may be disposed throughout all or a portion of an area between the first side 306 and the second side 308 of the seatback 302. In some examples, the energy absorbing material may be uniformly or non-uniformly disposed between the load plate 310 and the second side 308 and/or between load plate 312 and the second side 308. In some examples, the load plates 310 and/or 312 may be adhered to and/or integrally formed with the energy absorber. In some examples, lower assembly 304 may comprise one or more types of energy absorbing materials that is/are different from one or more types of energy absorbing material in seatback 302. Such types of materials may have properties and characteristics that differ from one another. For example, an energy absorbing material in lower assembly 304 may be stiffer and/or be more elastic than an energy absorbing material in seatback 302. In some examples, energy absorbing material may be any of a number of types of polymeric foams (expanded polypropylene (EPP) foam, urethane foam, polystyrene foam, etc.), plastic, aluminum, corrugated cardboard or other material, or a combination thereof. Such materials may be formed in a honeycomb or other structure.

In some examples, the energy absorbing material may include a crushable structure 314 that may be positioned within the seatback 302. The crushable structure 314 may be formed of a material that plastically deforms during a collision. The crushable structure 314 may extend across the width and height of the seatback 302, or may, as pictured in FIG. 3, only extend across a portion of the seatback 302 positioned behind an occupant seating position. In some examples, the crushable structure may be surrounded by other energy absorbing materials, such as an EPP foam. In such examples, the load plate 310 may span the EPP as well as the crushable structure 314 and thereby distribute load across both the EPP and the crushable structure 314 to further distribute load. In some examples, the load plate 310 may be coupled directly to the crushable structure 314 and/or the EPP foam surrounding the crushable structure. Examples of an energy absorbing device are described with respect to U.S. Pat. No. 11,279,270, titled "Occupant Protection System and Method Including Seatback," filed Oct. 25, 2019, and U.S. patent application Ser. No. 16/443,679, titled "Seat Crush Structure," filed Jun. 17, 2019, the entire contents of each are hereby incorporated by reference in their entirety for all purposes.

In examples, as mentioned above, seats 102 may be coupled (directly or indirectly) to a body portion 114 of vehicle 100. Body portion 114 may extend from a portion of the body upon which seats are attached to above or below a height of seatback 302. In particular examples, seatback 302, lower assembly 304, and one or more side assemblies 105 each may be coupled to a portion of the vehicle body. Coupling of these parts of seat 102 to the vehicle body may be direct and rigid so that there is substantially no relative motion between seat 102 and the vehicle body during a collision. Such coupling may contribute to the safeness of seat 102 by reducing or avoiding occurrence of point loads and/or flexure during a collision, as described below.

Figure 5:
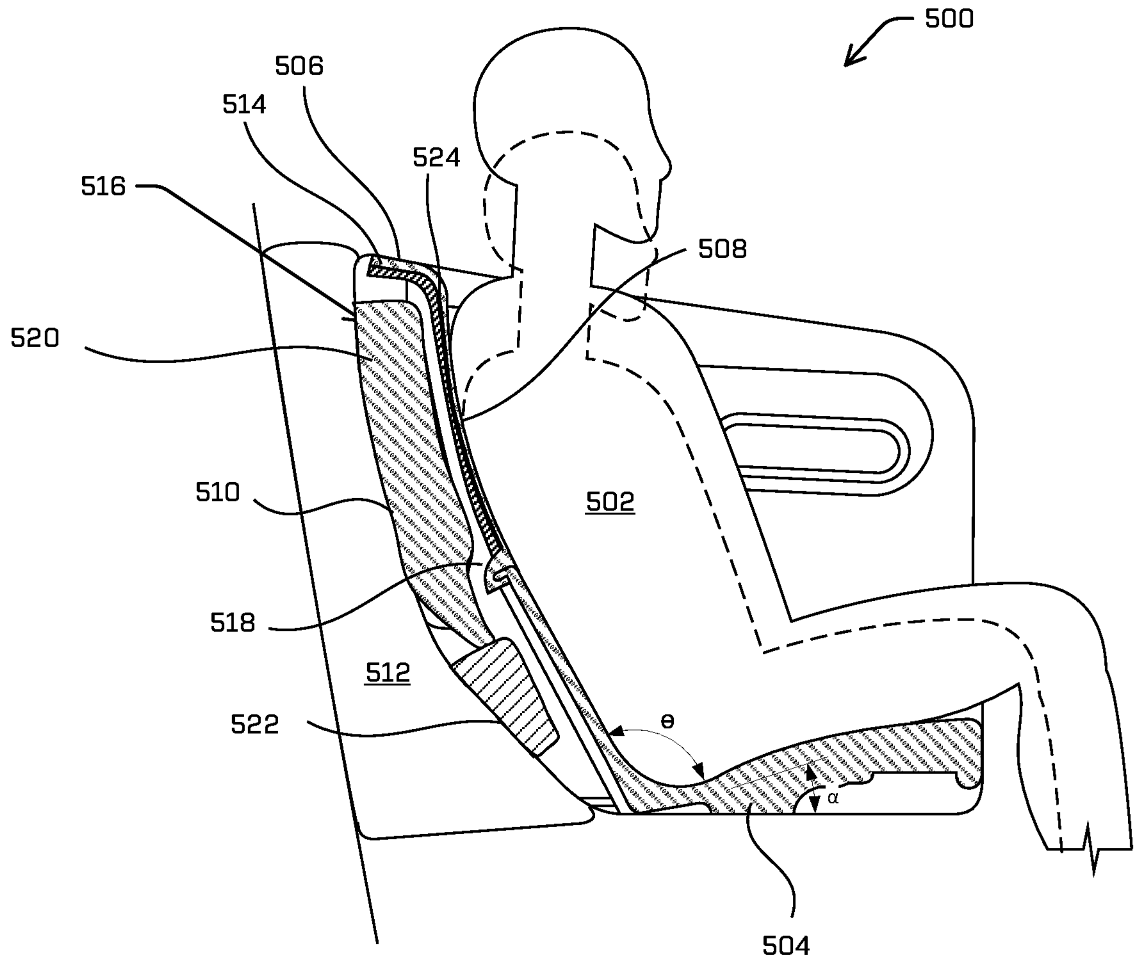
FIG. 5 is a cross-section of a seat including occupants of different sizes.

FIG. 5 illustrates an enlarged depiction of seat 500 disposed within the body of a vehicle, such as the vehicle 100. In FIG. 5, seat 500 is occupied by an occupant 502, which represents the size of the $50^{th}$-percentile portion of a population, and a second occupant (shown in dashed lines), which represents the size of the $5^{th}$-percentile portion of the population. Seat 500 has a seat bottom 504 and a seatback 506. The seat bottom 504 may be configured to receive the seat of the occupant 502. The seat bottom 504 may be disposed at an angle (α) relative to a floor of the vehicle. In some examples, the angle α may be substantially zero (meaning that the seat bottom 504 is substantially parallel to the floor area) while in other examples the angle α may be at inclined relative to the floor area (e.g., the angle α may be between 1 degree and 30 degrees). In some examples, the angle α of the seat bottom 504 relative to the floor area may be adjustable. Additionally, or alternatively, the seat 500 may have a seatback 506 which may be disposed at an angle (Θ) relative to the seat bottom 504. In some examples, the seatback 506 may be disposed substantially perpendicular to the seat bottom 504 and the angle Θ may be about 90 degrees, while in other examples the seatback 506 may be disposed at an oblique angle (e.g., Θ may be an angle between 91 degrees 120 degrees). In some examples, the angle Θ between the seatback 506 and/or seat bottom 504 may be adjustable.

The seatback 506, in some examples, may have a first side 508 and a second side 510. In some examples, the first side 508 of the seatback 506 may be opposite the second side 510 of the seatback 506. The first side 508 of the seatback 506 may be configured to receive and support a back of the occupant 502. The second side 510 of the seatback 506 may be adjacent to and/or may abut a portion of the body 512 of the vehicle 100. In some examples, the first side 508 of the seatback 506 may be comprised of materials such as leather, polyurethane, and/or fabric, for example. One or more layers of padding 514, such as elastomeric foam, may be disposed beneath the leather or fabric cover for passenger comfort. In some examples, the first side 508 of the seatback 506 may include multiple layers of the same or different materials. In some examples, an energy absorber 516 may be disposed within seat 500 between the first side 508 of the seatback 506 and the second side 510 of the seatback 506. During a collision, the energy absorber 516 may compress (in plastic deformation) between the back of the occupant 502 and the body of the vehicle 100 to decelerate the occupant 502.

The energy absorber 516 and the padding 514 may be disposed adjacent a load plate 524 that may cover a portion and/or all of the seatback 506. The load plate 524 includes a curved or non-flat surface formed of a rigid material. As shown in FIG. 5, the curvature of the load plate 524 mimics or matches a curvature of the back or spine of the occupant 502. The load plate 524 spreads the force applied against the seat, and over the energy absorber during an event such as a collision and increases the ramp rate of energy absorption. The load plate 524 may promote earlier restraint of the occupant during a collision to improve occupant safety. During a collision, the load plate 524 distributes the force as a result of the occupant moving over the energy absorber.

In some examples, the load plate 524 may be formed of a rigid material such as carbon fiber, aluminum, steel, plastic, or other such rigid materials including combinations of one or more materials. The load plate 524 may be configured to withstand and/or exceed the anticipated loads on the energy absorber. For example, the load plate 524 may be configured to withstand forces in excess of 8.95 kilonewtons. The load plate 524 may have a thickness of between one and three millimeters, or may, in some examples (such as in a case of a steel load plate) have a thickness of less than one millimeter. The load plate 524 may have a rectangular shape and may be positioned behind the occupant space where an occupant 502 sits within the vehicle. The load plate 524 may have a curvature as shown in FIG. 5 to match and/or accommodate the curvature of the back of the occupant. In some examples, the load plate 524 may also be curved in a second direction. The second direction may form a recess or pocket for the back and shoulders of the occupant 502 to rest within, thereby increasing comfort and alignment of the occupant 502 with the load plate 524 during use. In some examples, the load plate 524 may cover some or all of the seatback 506 at the first side 508.

The load plate 524 may, in some examples, have a varying thickness and/or other configuration besides a solid plate. For example, the load plate 524 may have a first thickness at a center of the load plate 524, e.g., a medial location where a spine of the occupant may be positioned when in the seat and have a second thickness at a distal edge of the load plate 524.

In some examples, the thickness may vary based on one or more design optimization algorithms. The load plate 524 may also include one or more openings or passages that may be used to reduce the weight of the load plate while maintaining the energy distribution characteristics. Examples of such additional load plate designs and configurations are shown and described with respect to FIGS. 7-13 below.

The energy absorber 516 in this example includes a backplane 518, a crush structure 520, and a pelvic support structure 522. The backplane 518 may extend from a first location at or above the seat bottom 504 to a second location at or below a top of the seatback 506. The crush structure 520 in this example protrudes from the backplane 518 toward the second side 510 of the seatback 506. In this example, the crush structure 520 protrudes from only a portion of the backplane 518. That is, in this example, the crush structure 520 includes multiple crushable elements that protrude from multiple different portions of the backplane 518, while other portions of the backplane 518 do not have crushable elements protruding therefrom.

The pelvic support structure 522 may be disposed below the backplane 518 and/or the crush structure 520 in a region proximate a pelvis of the occupant 502. The pelvic support structure 522 may have a same or different depth than the crush structure 520 and may be made of a same or different material than the backplane 518 and/or crush structure 520. By way of example and not limitation, the pelvic support structure 522 may have a greater depth than the backplane 518 and/or crush structure 520 and may be made of a material having a compression strength higher than that of the backplane 518 and/or crush structure 520. In some examples, as described above, the vehicle 100, may travel in a first direction. During a collision while traveling in the first direction, the backplane 518, the crush structure 520, and/or the pelvic support structure 522 may be configured to plasticly deform to absorb the energy of the impact and reduce the forces applied to the passenger's body during rapid deceleration or ramp down. In some examples, a second load plate (not shown) may be implemented to distribute load across the pelvic support structure 522 similar to the load plate 524 described herein.

Figure 6:
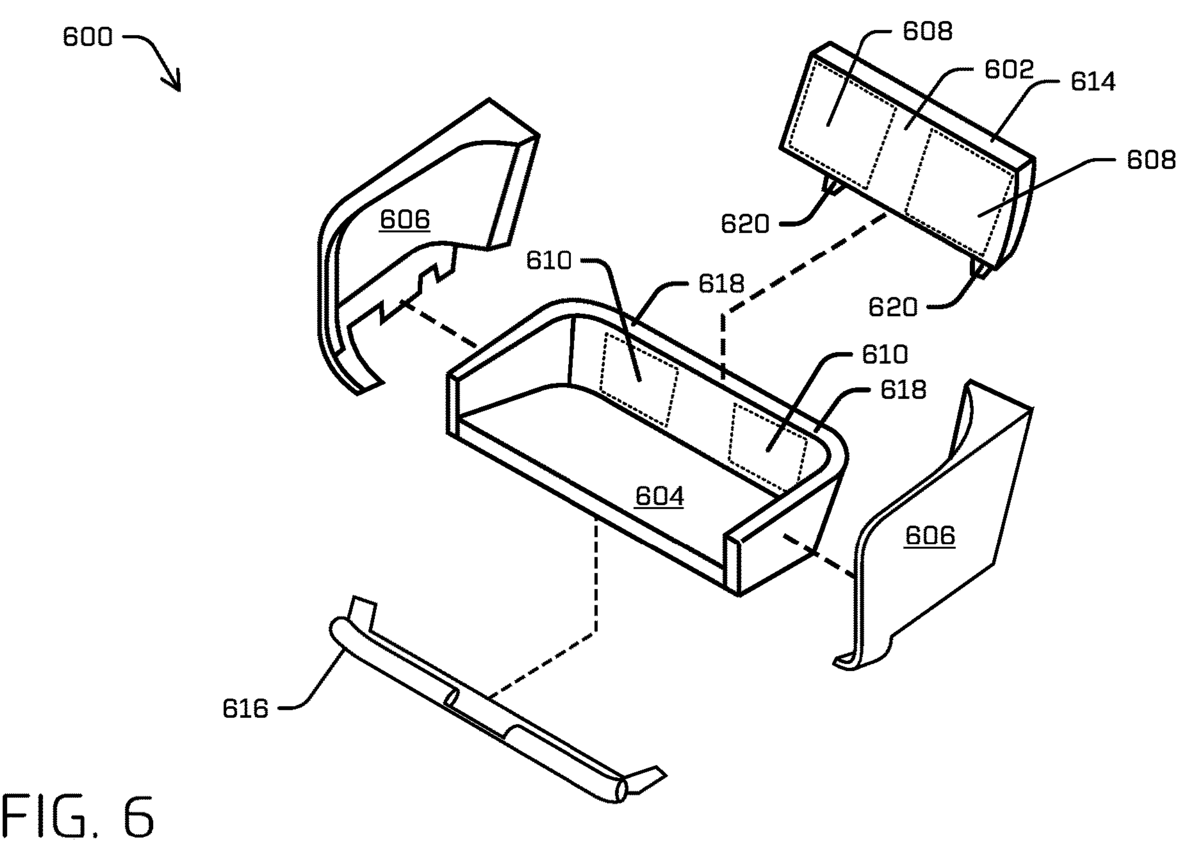
FIG. 6 is a perspective view of an example seat including load plates.

FIG. 6 is an exploded view of a seat 600, which may be the same as or similar to seat 102, described above. Seat 600 comprises a seatback 602, a lower assembly 604, and one or more side assemblies 606. In some examples, the one or more side assemblies 606 may include a load plate (not shown) and energy absorber for absorbing impact during side collisions. Details and location regarding connection between side assemblies 606 and lower assembly 604 may be based at least partly on a desired assembly process for a particular example. In other words, where side assemblies 606 meets lower assembly 604 may be located otherwise from what is illustrated in the figure. The side assemblies 606, lower assembly 604, and seatback 602 may couple together using releasable connections and/or permanent connections. For example, seatback 602 may couple to the lower assembly using connections 620 that engage with connections 618 of the lower assembly 604. The modularity enables various components to be replaced and/or exchanged for other configurations to result in multiple different seat configurations.

The seatback 602 includes load plates 608 and an energy absorber 614. The load plates 608 extend across a width of an occupant seat region, but do not extend across a full width of the seatback 602. The load plates 608 may be positioned underneath a cushioning material that provides comfort to the occupant. The load plates 608 may also be coupled to or integrally formed with the energy absorber 614. Other configurations of load plates 608 are shown and described with respect to FIGS. 7-13.

The lower assembly 604 may include load plates for a pelvic or lumbar region of the seat 600. The load plates 610 of the lower assembly may be substantially similar to the load plates 608 but may have a shorter height to fit on the lower assembly 604. The load plates 610 may have a more significant or greater curvature than the curvature of the load plates 608, to accommodate the shape of the lower back and provide a transition from the seat bottom to the back. The lower assembly 604 may include energy absorbers within the structure of the lower assembly 604 similar to the energy absorber of the seatback 602.

In some examples, the side assemblies 606 may include load plates that may distribute load over an energy absorber of the side assemblies. In such examples, the load plates may distribute load over energy absorbers in the event of a side or glancing collision.

Seat 600 may also include a front assembly 616 that attaches to lower assembly 604. Additionally, seat 600 may be configured to hold two occupants at the same time. Thus, seat 600 may include two load plates 608.

Figure 7:
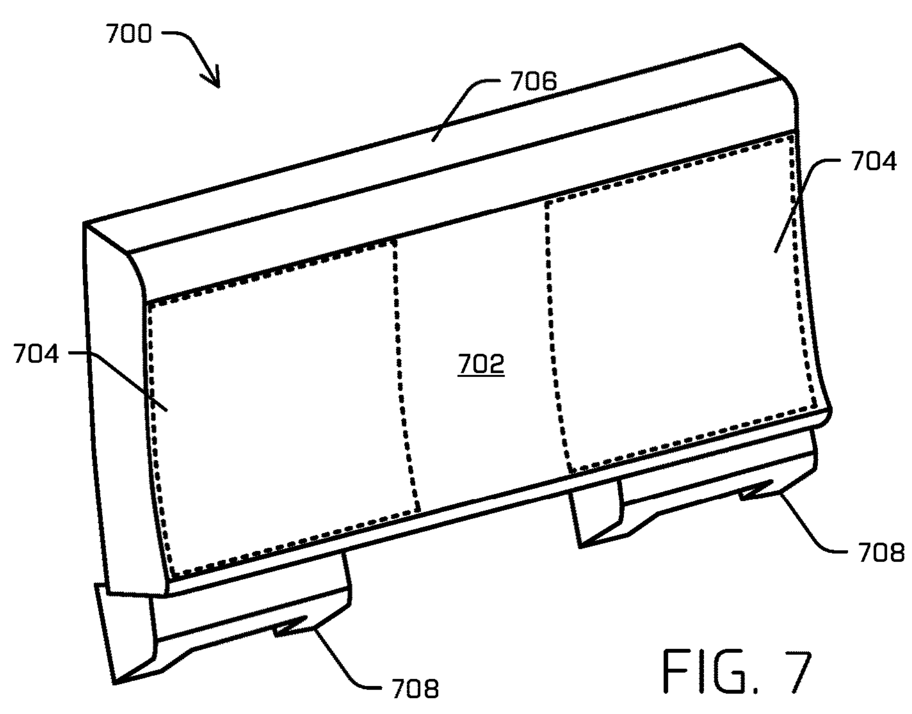
FIG. 7 is a perspective view of an example seatback including load plates.

FIG. 7 illustrates a perspective view of a seatback 700 including load plates 704 and energy absorber 706. The load plates 704 only extend across a portion of the seatback, and thereby may distribute load independently to the energy absorber, rather than being tied together. This may be advantageous, for example in situations with occupants of very different sizes sitting against the seatback 700. The use of independent load plates may reduce an overall weight of the seatback 700 while still implementing the load plate. The load plates 704 are shown with rectangular perimeters and positioned beneath a front surface 702 of the seatback 700, though other shapes and configurations may be used, for example with the load plates 704 having other shapes. The load plates 704 have a curvature from the bottom of the seatback 700 to the top of the seatback 700. The curvature may be constant or may be variable to match or mimic the curvature of a spine of an occupant. The seatback further includes attachment features 708 that may be used to couple the seatback 700 to the vehicle body and/or to a lower assembly of the seat.

Figure 8:
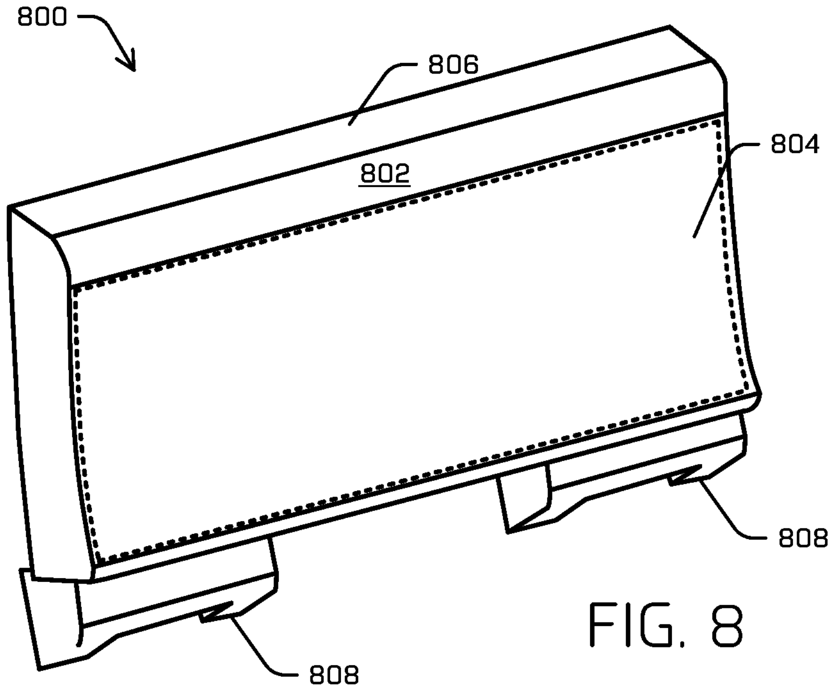
FIG. 8 is a perspective view of an example seatback including load plates.

FIG. 8 shows a seatback 800 similar to the seatback 700 of FIG. 7, including the front surface 802, energy absorber 806, and attachment features 808 similar to the front surface 702, energy absorber 706, and attachment features 708 of FIG. 7. The load plate 804 of FIG. 8 extends across the width of the seatback 800. In some examples, the load plate 804 may extend across a portion of the seatback, for example terminating within several inches of the edges of the seatback 800. In some examples, the load plate 804 has the rectangular shape as shown in FIG. 8. In some examples, the load plate 804 may have other shapes, for example with a thinner or narrower connecting section between the two seating positions such that the load plate 804 covers the majority of the seatback at the seating positions but only covers a portion of the middle of the front surface 802.

Figure 9:
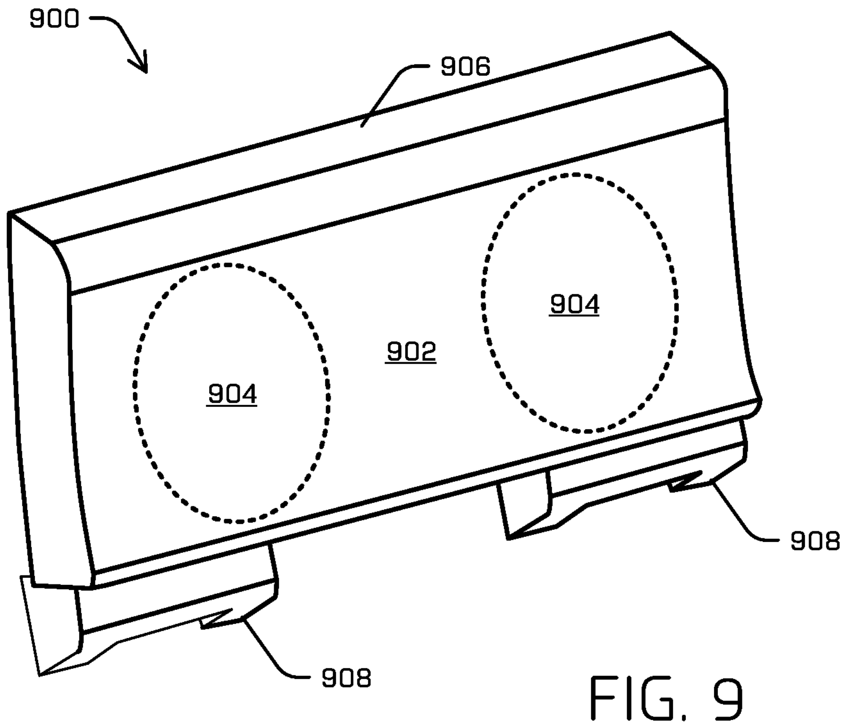
FIG. 9 is a perspective view of an example seatback including load plates.

FIG. 9 shows a seatback 900 similar to the seatback 700 of FIG. 7, including the front surface 902, energy absorber 906, and attachment features 908 similar to the front surface 702, energy absorber 706, and attachment features 708 of FIG. 7. In the seatback 900, the load plates 904 are shown having oval perimeters that are centered at the occupant space of the seatback 900. In an example with a three-person seat, the seatback 900 may include three oval-shaped load plates 904 spaced at the corresponding occupant locations (the third load plate is unillustrated but may be positioned between the two illustrated load plates 904). Other shapes of load plates may be implemented, circular, irregular, and other geometric or non-geometric shapes for the perimeter of the load plates 904.

FIGS. 10-13 illustrate load plates having varying characteristics over their width and/or height. The load plates shown in FIGS. 10-13 are illustrated as having rectangular perimeters and curvature as described herein, though other perimeters and curvatures may be used for the load plates including one or more of the features illustrated in FIGS. 10-13.

In FIG. 10, the load plate 1000 is shown having multiple sections 1002 that extend horizontally across the width of the load plate 1000. The sections 1002 may be coupled together, for example with a flexible connection 1004 at the center of the load plate 1000. The sections 1002 may therefore flex independently to isolate load distribution for particular regions of the seatback. In some examples, the sections 1002 may not be coupled to one another, but may be positioned adjacent one another and coupled to the front surface and/or energy absorber of the seatback. In some examples, the sections 1002 may have different shapes or configurations, for example with the section having chevron-like shapes, irregular perimeters, or other shapes.

In FIG. 11, the load plate 1100 is shown having openings 1102 formed therein. The openings 1102 are shown as circles that may reduce the weight of the load plate 1100 while still enabling the load plate 1100 to distribute a load across an energy absorber. In some examples, the openings 1102 may have other shapes and arrangements, for example to focus weight removal from particular regions of the load plate 1100 such as described with respect to FIG. 12.

In FIG. 12, the load plate 1200 is shown having multiple openings 1202 that may be selectively removed to reduce the weight of the load plate 1200 while maintaining a stiffness and/or structural integrity of the load plate 1200. The openings may be sized and/or shaped based on a simulation of expected loads on the load plate, for example as part of a design optimization that enables identification of portions of the load plate that may be removed for weight savings while also preserving structural integrity and stiffness of the load plate 1200.

In FIG. 13, the load plate 1300 is shown having varying thicknesses in different portions of the load plate 1300. For example, a center rib 1302 may have a first thickness greater than a thickness of a distal portion 1306 of the load plate 1300. The center rib 1302 may therefore have a greater stiffness than the remainder of the load plate 1300 for aiding in load distribution across the energy absorber while preventing flexing of the load plate 1300. Additionally, the thickness of the center rib 1302 may vary over the height of the load plate 1300, with the thickness tapering near the upper and lower edges of the load plate 1300. Horizontal sections 1304 may also have a variable thickness over the load plate 1300. The horizontal sections may have a second thickness greater than the thickness of the distal portion 1306. The second thickness may be greater than, less than, or the same as the first thickness. The horizontal sections 1304 may have a third thickness at a medial portion of the load plate 1300 (e.g., at or near the center) and may taper to a fourth thickness at or near the distal ends of the horizontal sections 1304.

EXAMPLE CLAUSES

A: A vehicle comprising: a rear-facing seat that includes a seatback assembly having a first side to receive an upper back of a passenger and a second side opposite the first side, the seatback assembly comprising: a first layer comprising a cushioning material positioned at the first side of the seatback assembly; a load plate disposed adjacent the first layer, the load plate having a curved shape defined by a first curvature and the load plate is formed of a rigid material; and an energy absorbing material that plastically deforms under a compressive force, the energy absorbing material mechanically coupled to the load plate and the second side of the rear-facing seat.

B: The vehicle of paragraph A, wherein the seatback assembly defines a first passenger seat and a second passenger seat and the load plate extends along a horizontal axis of the seatback assembly across the first passenger seat and the second passenger seat.

C: The vehicle of either paragraph A or B, wherein the seatback assembly defines a first passenger seat and a second passenger seat and the load plate is a first load plate that extends along a horizontal axis of the seatback assembly across the first passenger seat, the seatback assembly further comprising a second load plate that extends along the horizontal axis of the seatback assembly across the second passenger seat.

D: The vehicle of any one of paragraphs A-C, wherein the energy absorbing material has a second curvature based on a passenger profile corresponding to a spine shape of a passenger and the first curvature of the load plate comprises the second curvature.

E: The vehicle of any one of paragraphs A-D, wherein the load plate is mechanically coupled directly to the energy absorbing material.

F: The vehicle of any one of paragraphs A-E, wherein the energy absorbing material comprises at least one of expanded polypropylene (EPP) foam, plastic, aluminum, or corrugated cardboard.

G: The vehicle of any one of paragraphs 1-6, the vehicle comprising a structural component, wherein the second side of the seatback assembly is directly attached to the structural component.

H: A seatback structure for a vehicle, the seatback structure comprising: a first layer configured to receive a back of a passenger; a load plate comprising a rigid material that extends a first dimension across a width and a second dimension across a height of the seatback structure, the load plate having a first surface adjacent the first layer and a second surface opposite the first surface; and an energy absorbing material that plastically deforms under a compressive force, the energy absorbing material disposed on the second surface of the load plate.

I: The seatback structure of paragraph H, wherein the load plate has a thickness in a range of one millimeter (mm) to three millimeters (mm).

J: The seatback structure of either paragraph H or I, wherein the load plate comprises: carbon fiber; aluminum; steel; or rigid plastic.

K: The seatback structure of any one of paragraphs H-J, wherein the second dimension is between about 300 and 400 millimeters (mm), and the first dimension is between about 200 and 300 mm.

L: The seatback structure of any one of paragraphs H-K, wherein the load plate has a variable thickness, wherein the variable thickness varies from a first thickness at a medial portion of the load plate to a second thickness less than the first thickness at a distal edge of the load plate.

M: The seatback structure of any one of paragraphs H-L, wherein the seatback structure is configured to receive two passengers, and wherein the load plate extends across the seatback structure to support the two passengers.

N: The seatback structure of any one of paragraphs H-M, wherein the load plate has a curvature based on a spine shape of a passenger and the energy absorbing material conforms to the curvature.

O: A seat comprising: a seatback having a first side to receive an occupant and a second side opposite the first side, the seatback comprising: a seatback surface on the first side; a load plate comprising a rigid material that extends across a portion of the seatback, the load plate having a first surface disposed adjacent the seatback surface and a second surface opposite the first surface; and an energy absorbing material that plastically deforms under a compressive force, the energy absorbing material disposed on the second surface of the load plate.

P: The seat of paragraph O, wherein the load plate and energy absorbing material are integrally formed together.

Q: The seat of either paragraph O or P, wherein the seatback has a thickness from the first side to the second side in a range of between one hundred to one hundred and seventy-five millimeters and the seatback surface has a second thickness in a range of ten to twenty millimeters.

R: The seat of any one of paragraphs O-Q, wherein the seatback surface comprises a polyurethane layer, and wherein the polyurethane layer is adhered to the load plate.

S: The seat of paragraph R, wherein the load plate is adhered to the energy absorbing material.

T: The seat of any one of paragraphs O-S, wherein the load plate comprises horizontal sections, the horizontal sections extending across a width of the load plate and arranged in a stacked configuration across a height of load plate.

While the example clauses described above are described with respect to one particular implementation, it should be understood that, in the context of this document, the content of the example clauses can also be implemented via a method, device, system, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples. It is to be understood that other examples can be used and that changes or alterations, such as structural changes, can be made. Such examples, changes or alterations are not necessarily departures from the scope with respect to the intended subject matter. While the steps herein can be presented in a certain order, in some cases the ordering can be changed so that certain inputs are provided at different times or in a different order without changing the function of the systems and methods described. The disclosed procedures could also be executed in different orders.

What is claimed is:

1. A vehicle comprising:

a rear-facing seat that includes a seatback assembly having a first side to receive an upper back of a passenger and a second side opposite the first side, the seatback assembly comprising:

a first layer comprising a cushioning material positioned at the first side of the seatback assembly;

a load plate disposed adjacent the first layer, the load plate being formed of a rigid material of thickness less than one millimeter (mm); and an energy absorbing material that plastically deforms under a compressive force imparted by the passenger, the energy absorbing material being of thickness less than one hundred millimeters (mm) and mechanically coupled to the load plate and the second side of the rear-facing seat, wherein the load plate is configured to increase a ramp rate of energy absorbed by the energy absorbing material under the compressive force imparted by the passenger.

2. The vehicle of claim 1, wherein the seatback assembly defines a first passenger seat and a second passenger seat, and the load plate is a first load plate that extends along a horizontal axis of the seatback assembly across the first passenger seat, the seatback assembly further comprising:

a second load plate that extends along the horizontal axis of the seatback assembly across the second passenger seat.

3. The vehicle of claim 1, wherein the load plate has a first curvature in a first direction and a second curvature in a second direction that is perpendicular to the first direction.

4. The vehicle of claim 1, wherein the load plate is mechanically coupled directly to the energy absorbing material.

5. The vehicle of claim 1, wherein the energy absorbing material comprises at least one of expanded polypropylene (EPP) foam, plastic, aluminum, or corrugated cardboard.

6. The vehicle of claim 1, the vehicle comprising a structural component, wherein the second side of the seatback assembly is directly attached to the structural component.

7. The vehicle of claim 1, wherein the load plate is configured to receive a spine of the passenger at or near to a medial aspect of the load plate.

8. A seatback structure for a vehicle, the seatback structure comprising:

a first layer configured to receive a back of a passenger;

a load plate comprising a rigid material of thickness less than one millimeter (mm) that extends a first dimension across a width of the seatback structure and a second dimension across a height of the seatback structure, the load plate having a first surface adjacent the first layer and a second surface opposite the first surface; and an energy absorbing material that plastically deforms under a compressive force imparted by the passenger, the energy absorbing material being of thickness less than one hundred millimeters (mm) and disposed on the second surface of the load plate, wherein the load plate is configured to increase a ramp rate of energy absorbed by the energy absorbing material under the compressive force imparted by the passenger.

9. The seatback structure of claim 8, wherein the load plate comprises:

carbon fiber;

aluminum;

steel; or rigid plastic.

10. The seatback structure of claim 8, wherein the second dimension is between about 300 and 400 millimeters (mm), and the first dimension is between about 200 and 300 mm.

11. The seatback structure of claim 8, wherein the energy absorbing material conforms to a curvature based on an expected spine shape of the passenger.

12. The seatback structure of claim 8, wherein the load plate is configured to receive the back of the passenger at or near to a medial aspect of the load plate.

13. A seat comprising:

a seatback having a first side to receive a passenger and a second side opposite the first side, the seatback comprising:

a seatback surface on the first side;

a load plate comprising a rigid material of thickness less than one millimeter (mm) that extends across a portion of the seatback, the load plate having a first surface disposed adjacent the seatback surface and a second surface opposite the first surface; and an energy absorbing material that plastically deforms under a compressive force imparted by the passenger, the energy absorbing material being of thickness less than one hundred millimeters (mm) and disposed on the second surface of the load plate, wherein the load plate is configured to increase a ramp rate of energy absorbed by the energy absorbing material under the compressive force imparted by the passenger.

14. The seat of claim 13, wherein the load plate and the energy absorbing material are integrally formed together.

15. The seat of claim 13, wherein the seatback has a thickness from the first side to the second side in a range of between one hundred to one hundred and seventy-five millimeters and the seatback surface has a second thickness in a range of ten to twenty millimeters.

16. The seat of claim 13, wherein the seatback surface comprises a polyurethane layer, and wherein the polyurethane layer is adhered to the load plate.

17. The seat of claim 16, wherein the load plate is adhered to the energy absorbing material.

* * * * *